(12) United States Patent
Matsuda (10) Patent No.: US 9,106,534 B2
(45) Date of Patent: Aug. 11, 2015

(54) COMMUNICATION DEVICE

(75) Inventor: Munehisa Matsuda, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 283 days.

(21) Appl. No.: 13/175,180

(22) Filed: Jul. 1, 2011

(65) Prior Publication Data
US 2012/0030526 A1 Feb. 2, 2012

(30) Foreign Application Priority Data

Jul. 30, 2010 (JP) ................................. 2010-172822

(51) Int. Cl.
*G06F 11/00* (2006.01)
*H04L 12/24* (2006.01)
*H04L 12/26* (2006.01)

(52) U.S. Cl.
CPC ......... *H04L 41/0869* (2013.01); *H04L 12/2697* (2013.01); *H04L 43/10* (2013.01); *H04L 43/50* (2013.01)

(58) Field of Classification Search
USPC ........................................... 714/57; 358/1.15
See application file for complete search history.

(56) References Cited

U.S. PATENT DOCUMENTS

| 7,418,484 | B2 | 8/2008 | Presley |
| 2003/0105838 | A1 | 6/2003 | Presley |
| 2004/0143651 | A1 | 7/2004 | Allen et al. |
| 2005/0048953 | A1 | 3/2005 | Ohara |
| 2005/0080598 | A1 | 4/2005 | Iwanojko et al. |
| 2005/0200883 | A1* | 9/2005 | Mannion ....................... 358/1.15 |
| 2006/0079999 | A1* | 4/2006 | Husein .......................... 700/275 |
| 2006/0103868 | A1* | 5/2006 | Mitsui .......................... 358/1.13 |
| 2008/0215712 | A1* | 9/2008 | Ohara ........................... 709/220 |
| 2010/0235642 | A1* | 9/2010 | Ota et al. ...................... 713/175 |
| 2011/0239060 | A1* | 9/2011 | Okada ............................. 714/57 |
| 2012/0030526 | A1* | 2/2012 | Matsuda ......................... 714/57 |

FOREIGN PATENT DOCUMENTS

| CN | 1698033 A | 11/2005 |
| JP | 6-160119 | 6/1994 |
| JP | 8-297569 | 11/1996 |

(Continued)

OTHER PUBLICATIONS

Extended European Search Report dated Oct. 31, 2011 from related European Patent Application No. 11172412.6.

(Continued)

*Primary Examiner* — Yolanda L Wilson
(74) *Attorney, Agent, or Firm* — Scully, Scott, Murphy & Presser, P.C.

(57) ABSTRACT

A communication device includes a receiving unit, a first determining unit, and a sending unit. The receiving unit is configured to receive, from a terminal device, a plurality of input values corresponding to a plurality of setting items. The first determining unit, when the plurality of setting items includes a plurality of related items that are related to each other, is configured to determine whether input values, among the plurality of input values, corresponding to the plurality of related items are compatible. The sending unit is configured to send error data indicating an error screen toward the terminal device when the input values corresponding to the plurality of related items are incompatible, the error screen showing that at least one input value among the plurality of input values has an error.

10 Claims, 8 Drawing Sheets

COMBINATION ERROR DETERMINATION TABLE — 61

| Subnet Mask | IP Address | ... | Gateway Address | | | | ... |
| | | | 10.134.255.253 | 10.134.255.254 | 10.135.0.1 | 10.135.0.2 | |
| ... | ... | | | | | | |
| 255.0.0.0 | 10.134.255.253 | | ○ | ○ | ○ | ○ | |
| | 10.134.255.254 | | ○ | ○ | ○ | ○ | |
| | 10.135.0.1 | | ○ | ○ | ○ | ○ | |
| | 10.135.0.2 | | ○ | ○ | ○ | ○ | |
| ... | ... | | | | | | |
| 255.255.0.0 | 10.134.255.253 | | ○ | ○ | × | × | |
| | 10.134.255.254 | | ○ | ○ | × | × | |
| | 10.135.0.1 | | × | × | ○ | ○ | |
| | 10.135.0.2 | | × | × | ○ | ○ | |
| ... | ... | | | | | | |

○: CORRECT    ×: INCORRECT (56) References Cited

FOREIGN PATENT DOCUMENTS

| JP | 11-255358 A | 9/1999 |
|---|---|---|
| JP | 2000-123081 | 4/2000 |
| JP | 2005-079896 A | 3/2005 |
| JP | 2006-79250 | 3/2006 |
| JP | 2007-081890 A | 3/2007 |
| JP | 2009-080550 A | 4/2009 |
| WO | WO 03/048994 A2 | 6/2003 |

OTHER PUBLICATIONS

Communication Pursuant to Article 94(3) EPC dated May 15, 2013 from related European Patent Application No. 11 172 412.6.

Chinese Office Action dated Oct. 10, 2013 from related Chinese Application No. 201110222048.3, together with and English language translation.

Japanese Patent Office dated Mar. 18, 2014 from related Japanese Patent Application No. 2010-172822 together with English language translation.

Chinese Office Action dated Jun. 4, 2014 from related Chinese Application No. 201110222048.3, together with an English language translation.

Japanese Office Action dated Aug. 26, 2014 from related Japanese Patent Application No. 2010-172822 together with English language translation.

European Official Action dated Apr. 1, 2015 received in related application EP 11 172 412.6—1853.

* cited by examiner

(a) TCP/IP SETTINGS WINDOW

TCP/IP(Wired)

- 38 ~ TCP/IP  ⦿Enable  ○Disable
- 40 ~ IP Address  [10.135.150.28]
- 42 ~ Subnet Mask  [255.255.0.0]
- 44 ~ Gateway  [10.133.254.254]
- 48 ~ Boot Method  [AUTO ▽]
- 50 ~ ☑Enable APIPA
- 52 [Reset]  54 [Submit]

(b) ERROR WINDOW  58

TCP/IP(Wired)

Submit Error

- 38 ~ TCP/IP  ⦿Enable  ○Disable
- 40 ~ *IP Address*  [10.135.150.28]
- 42 ~ *Subnet Mask*  [255.255.0.0]
- 44 ~ *Gateway*  [10.133.254.254]
- 48 ~ Boot Method  [STATIC ▽]
- 50 ~ ☑Enable APIPA
- 52 [Reset]  54 [Submit]

DATA COMBINATION TABLE

| | ITEM1 | ITEM2 | ITEM3 |
|---|---|---|---|
| COMBINATION1 | IP Address | Subnet Mask | Gateway |
| COMBINATION2 | Paper Type | Paper Size | |
| COMBINATION3 | Dial Prefix | Dial Type | |

60

FIG.6(a)  COMBINATION ERROR DETERMINATION TABLE ~61

| Subnet Mask | IP Address | Gateway Address | | | | | |
|---|---|---|---|---|---|---|---|
| | | ... | 10.134.255.253 | 10.134.255.254 | ... | 10.135.0.1 | 10.135.0.2 |
| ... | | | | | | | |
| 255.0.0.0 | 10.134.255.253 | | O | O | | O | O |
| | 10.134.255.254 | | O | O | | O | O |
| | 10.135.0.1 | | O | O | | O | O |
| ... | | | | | | | |
| 255.255.0.0 | 10.134.255.253 | | O | O | O | x | x |
| | 10.134.255.254 | | x | O | O | x | x |
| | 10.135.0.1 | | x | x | x | O | O |
| | 10.135.0.2 | | | | | | O |
| ... | | | | | | | |

O : CORRECT    x : INCORRECT

FIG.6(b)  COMBINATION ERROR DETERMINATION TABLE ~62

| | | Size | | | | | | | |
|---|---|---|---|---|---|---|---|---|---|
| | | Letter | Legal | A4 | A5 | A6 | B5 | B6 | Folio |
| Type | Plain Paper | O | O | O | O | O | O | O | O |
| | Plain Paper(Thick) | O | O | O | O | O | O | O | O |
| | Thin Paper | O | O | O | O | O | O | O | O |
| | Plain Paper | O | O | O | O | O | O | O | O |
| | Thick Paper | O | O | O | O | O | O | O | O |
| | Thicker Paper | O | O | O | x | O | O | x | O |
| | Transparency | O | O | O | O | x | x | O | O |
| | Recycled Paper | O | O | O | O | O | O | O | O |

O : CORRECT    x : INCORRECT

COMMUNICATION DEVICE

CROSS REFERENCE TO RELATED APPLICATION

This application claims priority from Japanese Patent Application No. 2010-172822 filed Jul. 30, 2010. The entire content of the priority application is incorporated herein by reference.

TECHNICAL FIELD

The invention relates to a communication device capable of communicating with a terminal device, and particularly to a device for which various settings can be configured through operations on a terminal device.

BACKGROUND

A technology known in the art identifies setting items displayed on a screen that contain input errors and displays these items in red or in another manner that enables the user to easily distinguish what items contain errors.

SUMMARY

However, this conventional technology merely checks for errors in input data for each item individually, even when the display includes a plurality of items. Consequently, when the display includes a plurality of items, the conventional technology cannot always determine errors appropriately and convey these errors appropriately to the user.

Therefore, it is an object of the present invention to provide a technology capable of performing appropriate error determinations when there exists a plurality of setting items for which data is inputted, and capable of conveying these errors appropriately to the user.

In order to attain the above and other objects, the invention provides a communication device. The communication device includes a receiving unit, a first determining unit, and a sending unit. The receiving unit is configured to receive, from a terminal device, a plurality of input values corresponding to a plurality of setting items. The first determining unit, when the plurality of setting items includes a plurality of related items that are related to each other, is configured to determine whether input values, among the plurality of input values, corresponding to the plurality of related items are compatible. The sending unit is configured to send error data indicating an error screen toward the terminal device when the input values corresponding to the plurality of related items are incompatible, the error screen showing that at least one input value among the plurality of input values has an error.

According to another aspect, the invention provides a non-transitory computer readable storage medium storing a set of program instructions installed on and executed by a computer. The program instructions includes receiving, from a terminal device, a plurality of input values corresponding to a plurality of setting items, determining, when the plurality of setting items includes a plurality of related items that are related to each other, is configured to determine whether input values, among the plurality of input values, corresponding to the plurality of related items are compatible, and sending error data indicating an error screen toward the terminal device when the input values corresponding to the plurality of related items are incompatible, the error screen showing that at least one input value among the plurality of input values has an error.

BRIEF DESCRIPTION OF THE DRAWINGS

The particular features and advantages of the invention as well as other objects will become apparent from the following description taken in connection with the accompanying drawings, in which:

FIG. 6(*a*) is an example of a combination error determination table;

FIG. 6(*b*) is an example of a combination error determination table;

DETAILED DESCRIPTION

A. First Embodiment
A-1. System Configuration

Figure 1:
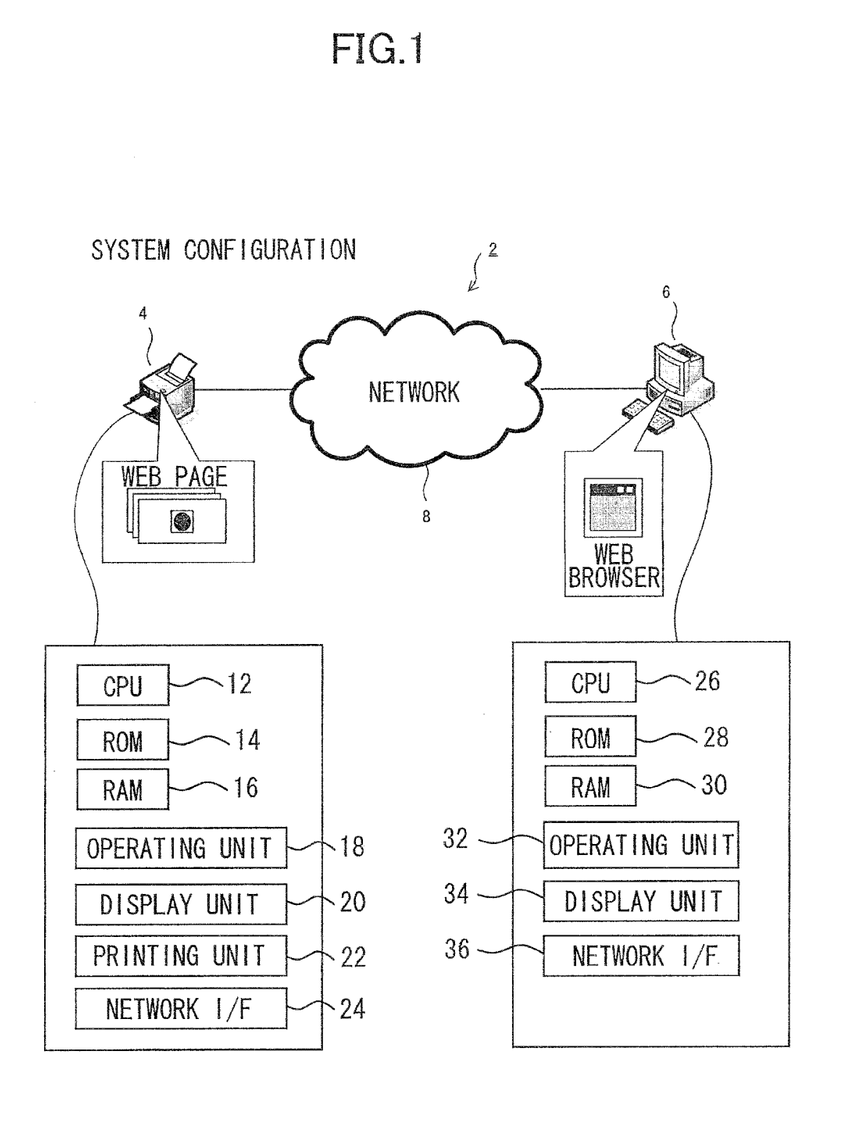
FIG. 1 is an explanation diagram illustrating structures of system, printer, and PC according to a first embodiment.

As shown in FIG. 1, a system 2 according to a first embodiment includes a printer 4, a personal computer (PC) 6, and a network 8. The printer 4 and the PC 6 are connected to the network 8 and are capable of communicating with each other via the network 8.

A-2. Structure of the Printer

The printer 4 includes a CPU 12, a ROM 14, a RAM 16, an operating unit 18, a display unit 20, a printing unit 22, and a network interface 24.

The CPU 12 performs overall control of all components in the printer 4.

The ROM 14 stores programs executed by the printer 4 to implement various process, such as a program to implement a printing process. The ROM 14 also stores a Web server program for implementing a Web server function on the printer 4. By executing the Web server program, the CPU 12 performs a server process described later. The ROM 14 stores data that is used when the printer 4 determines whether each input value contain an error in S200 of an error determination process (described later). The ROM 14 also stores a data combination table 60 and combination error determination tables (61, 62) described later.

The RAM 16 is used both as a storage area for storing data created when the CPU 12 performs various processes, and as a work area used by the CPU 12 when performing various processes.

The operating unit 18 includes various operating keys. By operating the operating unit 18, the user can direct the printer 4 to execute various processes, such as a copy process.

The display unit 20 is a display panel that functions to display various information.

The printing unit 22 executes printing processes based on print commands.

The network interface 24 functions to connect the printer 4 to the network 8.

A-3. Structure of the PC

The PC 6 includes a CPU 26, a ROM 28, a RAM 30, an operating unit 32, a display unit 34, and a network interface 36.

The CPU 26 performs overall control of all components in the PC 6.

The ROM 28 stores a Web browser program for implementing a Web browser function with the PC 6. The CPU 26 executes the Web browser program for displaying a window on the display unit 34 corresponding to a Web page acquired from a Web server (the printer 4, for example).

The RAM 30 is used both as a storage area for storing data created when the CPU 26 performs various processes, and as a work area used by the CPU 26 when performing various processes.

The operating unit 32 includes a keyboard and a mouse. By operating the operating unit 32, the user can direct the PC 6 to execute various processes. For example, the user can launch the Web browser program by performing an operation on the operating unit 32. The user can also input characters, numbers, and the like into the PC 6 through operations on the operating unit 32.

The display unit 34 functions to display various information, such as Web pages.

The network interface 36 functions to connect the PC 6 to the network 8.

A-4. Overview of the First Embodiment

Next, an overview of the first embodiment will be described with reference to FIG. 2. The following description provides an example in which the user operates the PC 6 to configure TCP/IP settings for the printer 4.

First, the user performs an operation on the operating unit 32 of the PC 6 to launch the Web browser program. Once the Web browser program is started, the PC 6 functions as a Web browser.

When the user performs a specific operation on the operating unit 32, the PC 6 transmits an HTTP request to the printer 4 requesting a Web page specified by the user. Upon receiving the HTTP request for a Web page, the printer 4 returns the specified Web page to the PC 6. The PC 6 receives the Web page and displays a window corresponding to the Web page on the display unit 34.

When the PC 6 requests a Web page from the printer 4 for configuring TCP/IP settings, the printer 4 returns the TCP/IP Settings Web page to the PC 6, and the PC 6 displays a TCP/IP Settings window on the display unit 34 based on the received Web page. At this time, the user inputs data for each item in the TCP/IP Settings window through operations on the operating unit 32.

Figure 2:
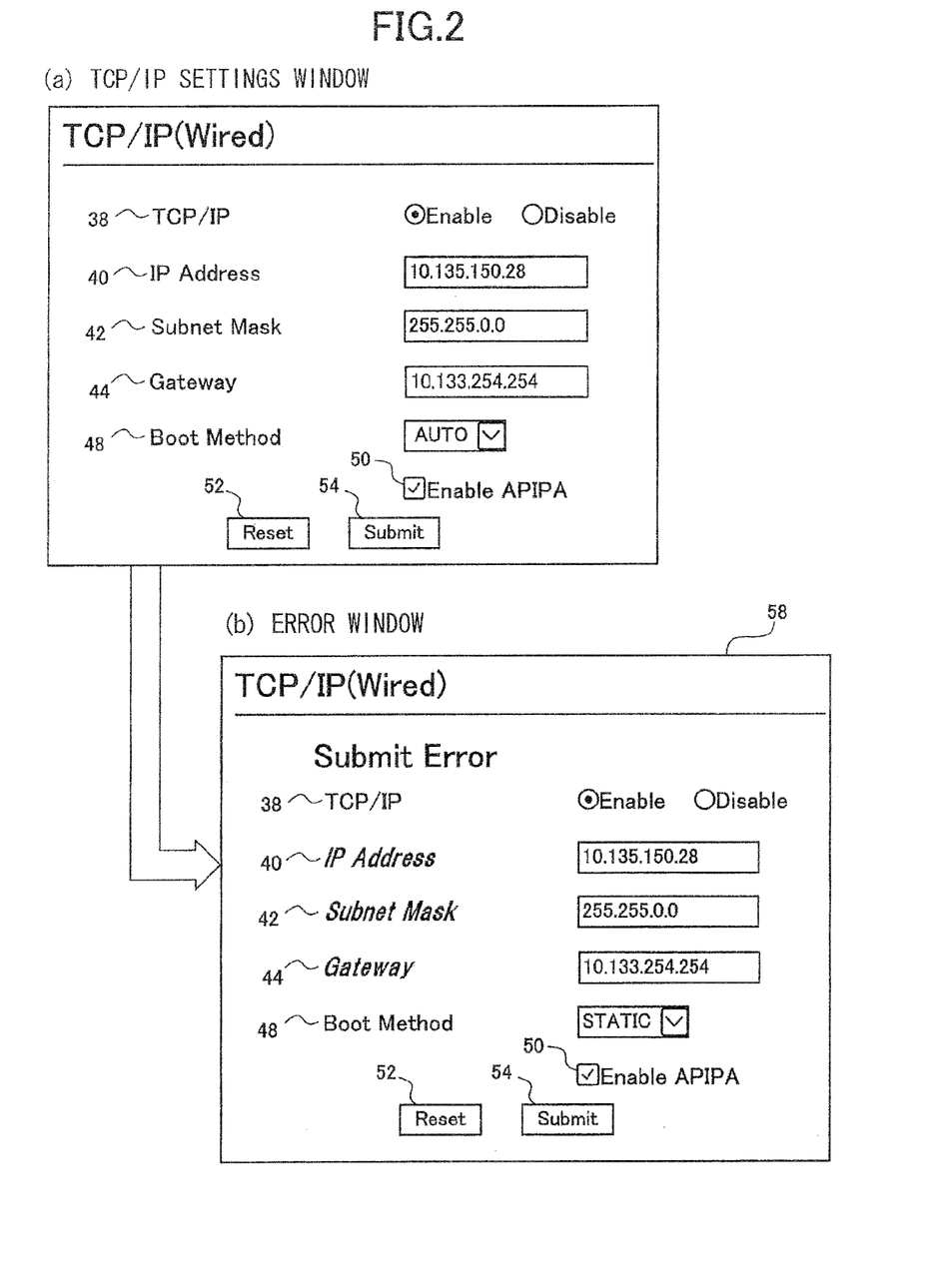
FIG. 2 is an explanation diagram illustrating an overview of the first embodiment, where (a) in FIG. 2 illustrates a TCP/IP Settings window and (b) in FIG. 2 illustrates an error window.

A portion (a) in FIG. 2 shows an example of the TCP/IP Settings window after the user has inputted data for each settings item.

As shown in the portion (a) in FIG. 2, the TCP/IP Settings window includes a TCP/IP setting item 38, an IP Address setting item 40, a Subnet Mask setting item 42, a Gateway setting item 44, a Boot Method setting item 48, an Enable APIPA setting item 50, a Reset button 52, and a Submit button 54.

If the user inputs the data as shown in the portion (a) in FIG. 2 for all settings items in the TCP/IP Settings window and subsequently presses the Submit button 54, the PC 6 transmits the inputted setting values to the printer 4. At this time, the printer 4 determines whether any of the inputted data contain errors, creates response data indicating the results of this determination, and sends the response data to the PC 6.

When the user inputs the data shown in the portion (a) in FIG. 2, the PC 6 receives error data from the printer 4 indicating that the input data contains errors. At this time, the PC 6 renews the display on the display unit 34 to an Error window 58 shown in a portion (b) in FIG. 2. The Error window 58 indicates that the TCP/IP settings cannot be configured using the input data shown in the portion (a) in FIG. 2.

Specifically, the window in the portion (b) in FIG. 2 indicates that the printer 4 cannot communicate with the gateway corresponding to the data inputted in the display unit 34 using the values inputted in the IP Address setting item 40 and the Subnet Mask setting item 42 shown in the portion (a) in FIG. 2. That is, the values inputted for the IP Address setting item 40, the Subnet Mask setting item 42, and the Gateway setting item 44 are not compatible. To indicate this incompatibility among the IP Address setting item 40, the Subnet Mask setting item 42, and the Gateway setting item 44, the PC 6 italicizes these three setting items in the Error window 58. In other words, the items whose input values are determined to be incompatible are displayed, in a manner different from setting items other than the items whose input values are determined to be incompatible among the plurality of setting items.

Thus, when the user presses the Submit button 54 after inputting the values shown in the portion (a) in FIG. 2 for the IP Address setting item 40, the Subnet Mask setting item 42, and the Gateway setting item 44, the Error window 58 is displayed, not because the input data for each individual setting is incorrect, but because the inputted values for these three items are incompatible. Accordingly, the user can recognize that an error exists in the data inputted in the TCP/IP Settings window.

In other words, although the IP Address setting item 40, the Subnet Mask setting item 42, and the Gateway setting item 44 can each be configured individually, the system of the embodiment determines whether there is any errors of each input value in the setting items, not just for each setting individually, but by considering values inputted for other settings as well. Therefore, the system can detect errors more appropriately and can convey these errors more appropriately to the user.

Further, the PC 6 displays the IP Address setting item 40, the Subnet Mask setting item 42, and the Gateway setting item 44 in italics in the Error window 58. By italicizing all items whose input values are incompatible, the PC 6 enables the user to recognize that an error related to these setting items has occurred,

A-5. Server Process

Next, a server process executed by the printer 4 will be described with reference to the flowchart in FIG. 3. The printer 4 (more specifically, the CPU 12 of the printer 4) executes the server process in FIG. 3 after the power to the printer 4 is turned on.

Figure 3:
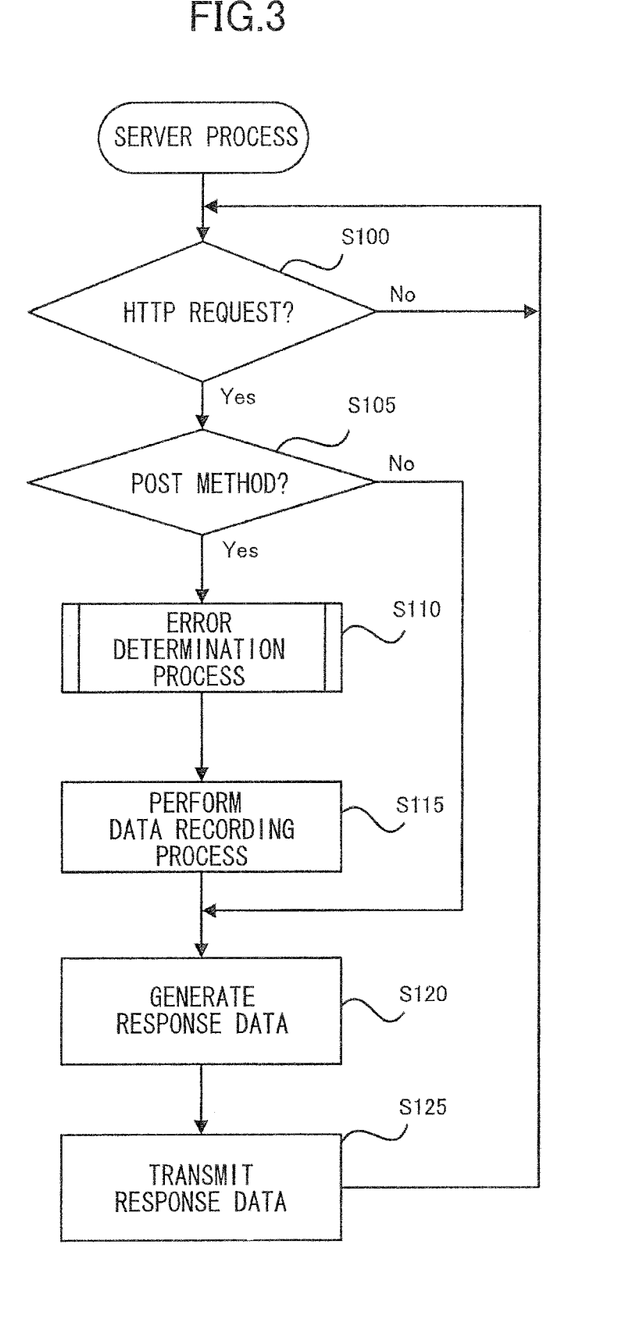
FIG. 3 is a flowchart illustrating a server process according to the first embodiment.

In S100 at the beginning of the server process shown in FIG. 3, the printer 4 determines whether an HTTP request was received. If the printer 4 determines that an HTTP request was not received (S100: NO), the printer 4 returns to S100 and repeats the determination until an HTTP request has been received.

When the printer 4 determines that an HTTP request was received (S100: YES), in S105 the printer 4 determines whether the HTTP request method employed for issuing the HTTP request is the POST method. A request method is an HTTP-defined method indicating how a client transmits or retrieves data. In the POST method, the client transmits data (input values) in the body of the request. The following description will be based on the printer 4 receiving an HTTP request from the PC 6.

If the printer 4 determines that the HTTP request method is not the POST method (S105: NO), the printer 4 advances to S120 and generates response data corresponding to the HTTP request. In S125 the printer 4 transmits the response data to the PC 6.

For example, when the PC 6 transmits an HTTP request for a TCP/IP Settings Web page, the PC 6 will use the GET method rather than the POST method. In this case, the printer 4 will determine that the HTTP request method is not the POST method (S105: NO). Accordingly, in S120 the printer 4 generates, as the response data, the TCP/IP Settings Web page based on the HTTP request, and in S125 transmits the Web page to the PC 6.

After completing the process in S125, the printer 4 returns to S100.

On the other hand, if the printer 4 determines in S105 that the HTTP request method is the POST method (S105: YES), in S110 the printer 4 performs the error determination process.

For example, when the user inputs data for each item in the TCP/IP Settings window displayed by the PC 6 and presses the Submit button 54, the PC 6 transmits the inputted values for these items to the printer 4 according to the POST method. Consequently, in S105 the printer 4 determines that the HTTP request method is the POST method, and in S110 executes the error determination process.

The error determination process is performed to determine whether input values for items transmitted according to the POST method contain errors. The error determination process will be described later in greater detail.

After completing the error determination process, in S115 the printer 4 performs a data recording process to record (i.e., set) input values for the corresponding settings when the input values were determined in the error determination process of S110 to be error-free. In S115 the printer 4 does not record remaining input values that are determined to contain errors in S110. If all input values were determined to contain errors in the error determination process of S110, the printer 4 does not record any input values in the data recording process.

After completing the data recording process, in S120 the printer 4 generates response data. More specifically, if any input values were determined to contain errors in the error determination process of S110, in S120 the printer 4 generates error data for displaying an Error window in which all items corresponding to input values determined to contain errors are displayed in italics. However, if the printer 4 found no input values to contain errors in the error determination process of S110, in S120 the printer 4 generates setup complete data for displaying a Setup Complete window (not shown) in which the message "Setup completed" is displayed.

In S125 the printer 4 transmits the response data generated in S120 to the PC 6 and subsequently returns to S100.

A-6. Error Determination Process

Next, the error determination process will be described with reference to FIGS. 4 through 6.

Figure 4:
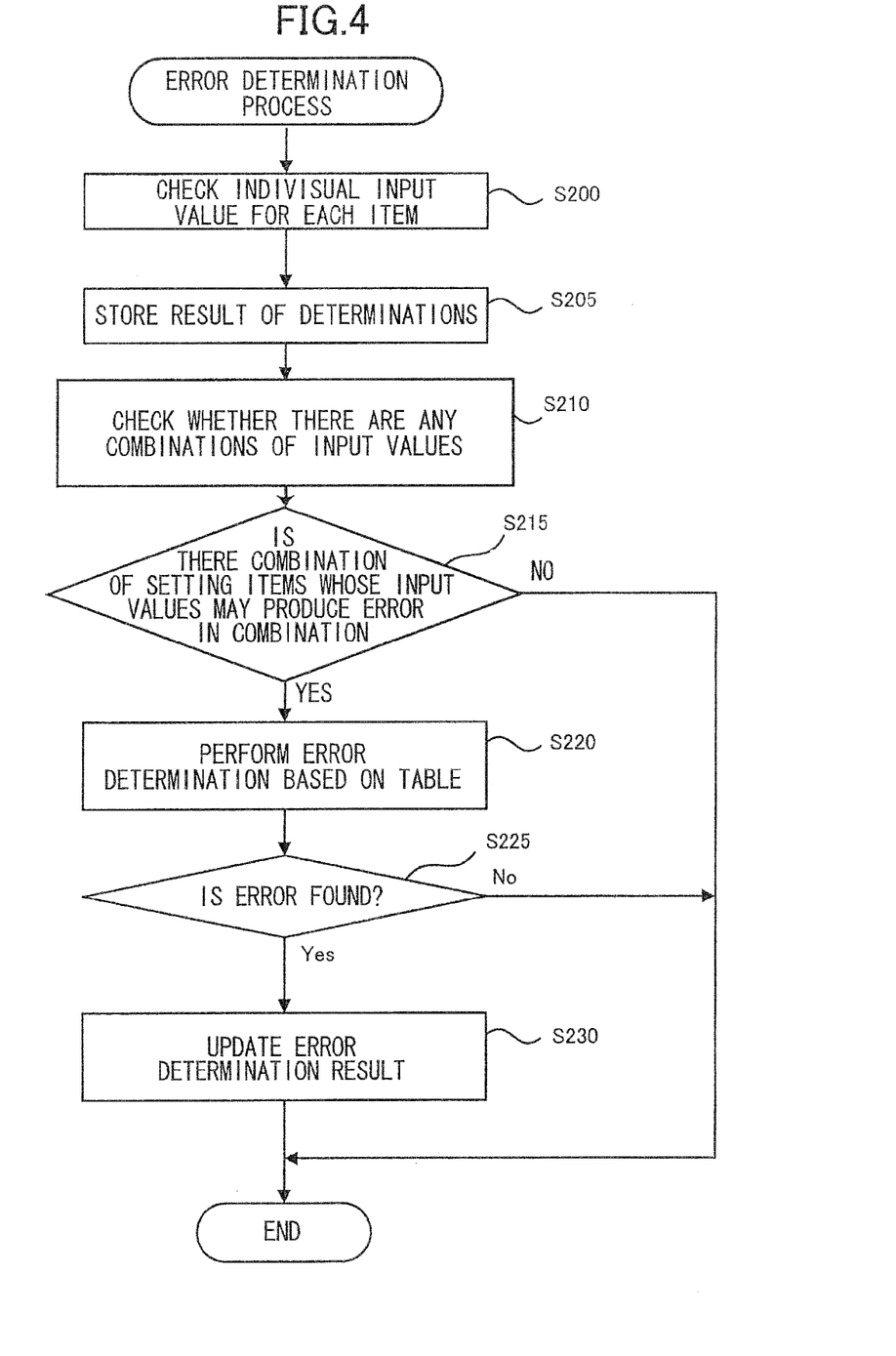
FIG. 4 is a flowchart illustrating an error determination process according to the first embodiment.

In S200 at the beginning of the error determination process shown in FIG. 4, the printer 4 checks the input values for each setting items transmitted according to the POST method to determine whether each individual input value contains an error. The determination process will be described next in greater detail.

The printer 4 receives input values and item data indicating the setting items corresponding to these input values from the PC 6. The printer 4 stores the input format and the range of values that can be set within this input format (i.e., 0-255) in the ROM 14 for each setting item. For example, for the IP Address setting, the printer 4 stores the input format "(value)(.)(value)(.)(value)(.)(value)" in the ROM 14. The printer 4 similarly stores an input format and range of values in the ROM 14 for the Subnet Mask setting and the Gateway setting. For the Paper Size setting, the printer 4 stores the input format as one of the paper sizes "letter," "legal," "A4," "A5," etc.

In S200 the printer 4 determines whether the input format for each input value conforms to the input format of the setting item corresponding to that input value. Further, when the input format has a range of values, the printer 4 determines whether the input value falls within this range. The printer 4 determines that the input value contains an error if the input format of the value does not conform to the format of the corresponding setting item or if the input value does not fall within the range of values for the corresponding item when the input format for the item has a range. On the other hand, the printer 4 determines that the input value does not contain an error when the input format of the value conforms to the input format of the corresponding setting item and when the input value falls within the range of values for the input format when the input format has a range.

In S205 the printer 4 stores the results of the determinations in S200 in the RAM 16. These results (hereinafter referred to as the "error determination results") indicate whether the input values contain errors. Specifically, the printer 4 stores items whose input values were determined to contain errors in correlation with data indicating an error. The printer 4 also stores items whose input values were determined not to contain errors in correlation with data indicating no error.

In S210 the printer 4 references a data combination table 60 to determine whether there are any combinations of input values for setting items transmitted according to the POST method that can produce an error in combination. FIG. 5 shows an example of the data combination table 60. The data combination table 60 shows setting items for which errors can be determined in combination. The data combination table 60 is stored in the ROM 14.

In S215 the printer 4 determines whether there exists a combination of setting items, among the setting items corresponding to input values transmitted according to the POST, that may produce an error in combination. That is, the printer 4 determines that there exist setting items for which an error can be determined in combination (S215: YES) when a combination of setting items, among the setting items corresponding to input values transmitted according to the POST method, match one of the Combinations 1-3 indicated in the data combination table 60, and determines that there exist no setting items for which an errors can be determined in combination (S215: NO) when there exists no combination of setting items, among the setting items corresponding to input values transmitted according to the POST method, that match one of the Combinations 1-3 indicated in the data combination table 60.

When the printer 4 determines that there exist no setting items for which an error can be determined in combination (S215: NO), the printer 4 ends the error determination process since there is no need to update the error determination results.

On the other hand, if the printer 4 determines that there exist setting items for which an error can be determined in combination (S215: YES), in S220 the printer 4 performs a determination process to determine whether the input values for the combination of setting items contain an error based on a combination error determination table (61, 62). The combination error determination table (61, 62) indicates "correct" or "incorrect" values for each combination of input values that can be set for the setting items that can produce an error in combination. Thus, the printer 4 determines that the combination of input values for setting items that can produce an error in combination do not contain an error when the combination error determination table indicates "correct" for this combination of input values, and determines that the combination of input values contain an error when the combination error determination table indicates "incorrect" for this combination of input values.

In the embodiment, a combination error determination table is prepared for each of the Combinations 1-3 indicated in the data combination table 60. These combination error determination tables are stored in the ROM 14.

Figure 5:
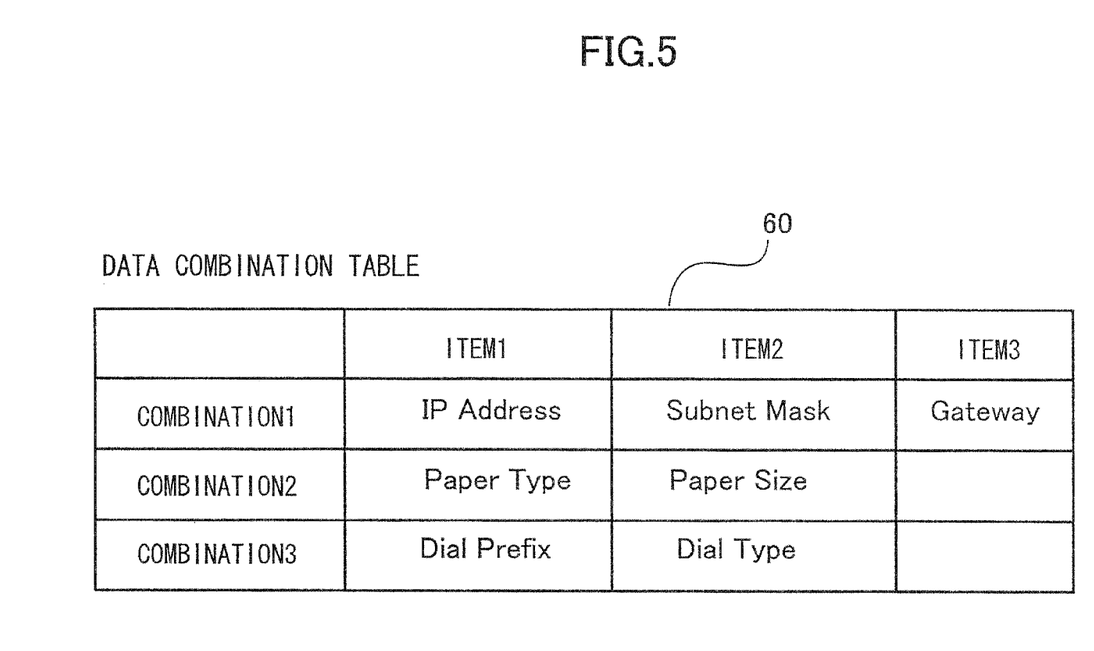
FIG. 5 is an example of data combination table.
Figure 6A:
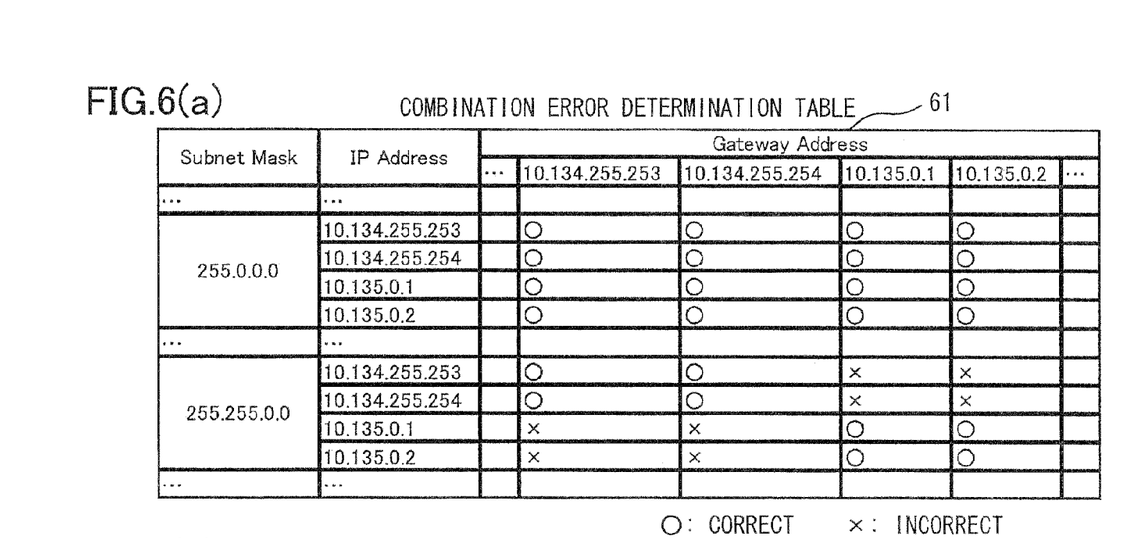
Figure 6B:
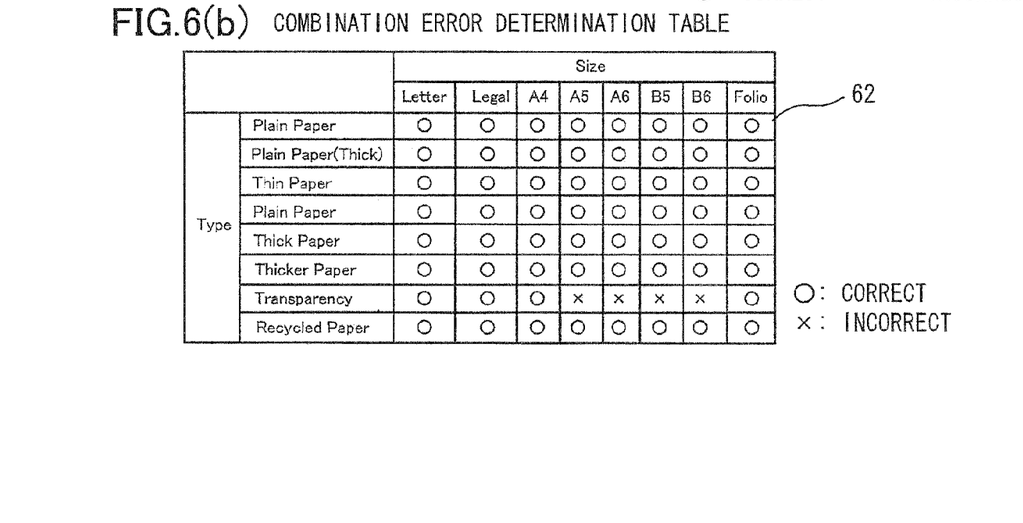

FIGS. 6(a) and 6(b) show two samples of the combination error determination tables 61 and 62. In the error determination tables 61 and 62, a symbol "o" indicates that the combination is "correct", and a symbol "x" indicates that the combination is "incorrect". FIG. 6(a) shows a combination error determination table 61 for Combination 1 in the data combination table 60. FIG. 6(b) shows a combination error determination table 62 for Combination 2 in the data combination table 60.

The settings in Combination 2 (paper type and paper size) are specified by the user when performing a copy operation on the printer 4. At this time, the user selects the size of paper to be used in the copy operation, then selects the type of paper from among those displayed on the display unit 20. For example, if the user has selected "A.5" as the paper size and "transparency" as the paper type and submits this combination of input values, the printer 4 determines from the combination error determination table 62 that this combination of input values contains an error. The combination error determination table 62 is created to indicate "correct" for all combinations of paper sizes and paper types capable of yielding good print quality.

The user configures the settings for Combination 3 (dial prefix and dial type) when the printer 4 possesses a telephone function. Here, the user enters data for a combination including dial type (e.g., tone or pulse) and dial prefix, which specifies a combination of symbols and/or numbers to be added automatically before the telephone number when the user dials, A combination error determination table for Combination 3 is created to indicate "correct" for the combinations <Dial Type: tone> and <Dial Prefix: 0-9, *, #> and <Dial Type: not tone> and <Dial Prefix: 0-9>. The printer 4 determines that a combination of input values contains an error when the user inputs the combination of input values for dial type and dial prefix specified as "incorrect" in the combination error determination table for Combination 3.

In S225 the printer 4 determines whether the combination of input values was found to contain an error in S220. If the combination of input values was not found to contain an error in S220 (S225: NO), the printer 4 ends the error determination process since there is no need to update the error determination results.

However, if the printer 4 determines that the combination of input values was found to contain an error in S220 (S225: YES), in S230 the printer 4 updates the error determination results. More specifically, the printer 4 stores data indicating an error in correlation with each setting item for the combination of input values determined in S220 to contain an error.

Using the example of input values shown in the portion (a) in FIG. 2, in S205 the IP Address setting item 40, the Subnet Mask setting item 42, and the Gateway setting item 44 are stored in correlation with data indicating the input values contain no errors. However, the printer 4 determines in S220 that the combination of input values for these three settings contains an error. Thus, in S230 the printer 4 stores data indicating an error for the IP Address setting item 40, the Subnet Mask setting item 42, and the Gateway setting item 44 in place of the data indicating no error.

After updating the error determination results, the printer 4 ends the error determination process.

B. Second Embodiment

Next, a second embodiment of the invention will be described with reference to FIG. 7. The second embodiment differs from the first embodiment only in the error determination process. Accordingly, only the error determination process according to the second embodiment will be described here.

Figure 7:
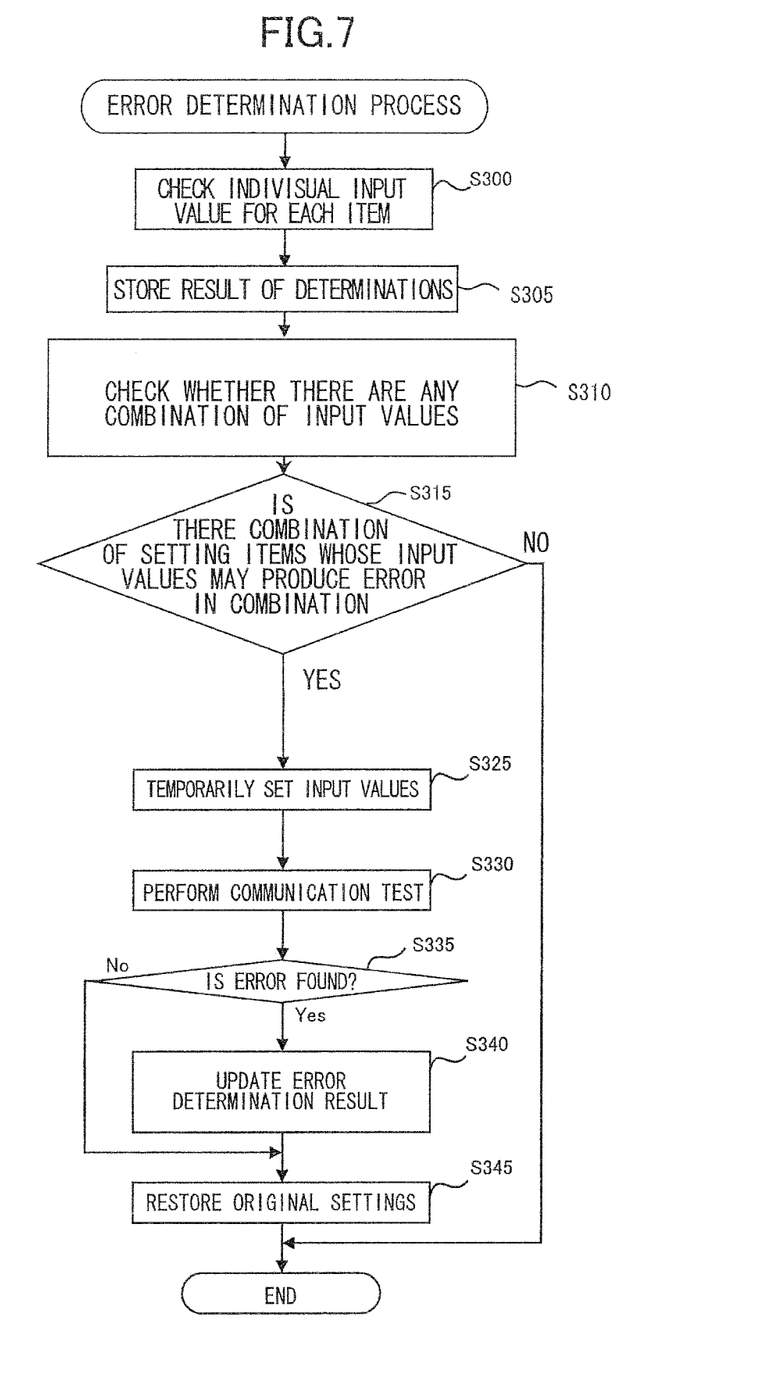
FIG. 7 is a flowchart illustrating an error determination process according to a second embodiment.

FIG. 7 is a flowchart illustrating steps in the error determination process according to the second embodiment. Since S300-S310 in FIG. 7 correspond to S200-S210 in FIG. 4 of the first embodiment, a description of these steps will be omitted.

If the printer 4 determines in S315 that there do not exist any setting items that may be found to contain an error in combination (S315: NO), the printer 4 ends the current process since there is no need to update the error determination results.

However, when the printer 4 determines that there exist setting items that may be found to contain an error in combination (S315: YES), in S325 the printer 4 temporarily configures settings based on the input values saved in the RAM 16. For example in the case where the combination of the IP Address setting item, the Subnet Mask setting item, and the Gateway setting item is subject for the error determination that matches Combination 1 in the data combination table 60, the printer 4 temporarily sets the IP address to the input value saved for the IP Address setting item, temporarily sets the subnet mask to the input value saved for the Subnet Mask setting item, and temporarily sets the gateway to the input value saved for the Gateway setting item.

In S330 the printer 4 performs a communication test based on the temporary settings configured in S325. Thus, in the case where the combination of the IP Address setting item, the Subnet Mask setting item, and the Gateway setting item is subject for the error determination, the printer 4 pings the temporary gateway using the temporarily set IP address and the subnet mask. Here, a "ping" is a simple packet transmitted to confirm whether communication is possible.

In S335 the printer 4 determines whether the result of the communication test in S330 according to the temporary settings configured in S325 was an error. In other words, in the case of the combination that matches Combination 1, the printer 4 determines whether a response to the ping transmitted in S330 was returned. The printer 4 determines that the result of communications in S330 was not an error when a response was returned (S335: NO). The printer 4 determines that the communication result was an error when no response was returned within a fixed time after the ping was transmitted (S335: YES).

When the printer 4 determines that the communication test in S330 did not result in an error (S335: NO), then there is no need to update the determination results. Accordingly, the printer 4 skips to S345 and restores the original printer settings that were replaced by the temporary settings in S325.

However, if the printer 4 determines that the communication test in S330 resulted in an error (S335: YES), in S340 the printer 4 updates the error determination results. Specifically, the printer 4 stores data indicating an error in correlation with each setting item corresponding to the input values temporarily set in S325.

In this way, when there exist settings that may contain an error in combination, the printer 4 temporarily sets each setting to the inputted value, attempts to communicate according to the temporary settings, and determines whether the input values for these setting items contain an error based on the results of the test communications. This method eliminates the need to store a combination error determination table in the ROM 14, thereby reducing the load on the printer 4.

In S345 the printer 4 restores the original printer settings that were replaced by the temporary settings in S325.

The error determination process is complete when the original printer settings have been restored.

The second embodiment applies to Combination 1 among the three combinations shown in the data combination table of FIG. 5. However, the second embodiment may be applied to other cases not shown in the data combination table of FIG. 5, such as a combination including an SMTP Server Address setting and an SMTP Port setting (i.e., a combination of settings for mail transmission) and a combination including a Communication Mode setting, a Wireless Network Name setting, and a Channel setting (i.e., a combination of wireless settings).

When applying the second embodiment to the combination of settings for mail transmission, in S330 the printer 4 pings or transmits test mail to the SMTP server. If the printer 4 does not receive a response to the ping or test mail, the printer 4 determines that the communication resulted in an error (S335: YES). When the second embodiment is applied to a combination of items for wireless settings, in S330 the printer 4 transmits a connection request to an access point inputted by the user. When a Connection Authorized notification is received from the access point in response to the connection request, the printer 4 determines that the communication did not result in an error (S335: NO). However, if a Connection Denied notification is received from the access point, the printer 4 determines that the communication resulted in an error (S335: YES).

In the examples of the mail transmission settings and the wireless settings, the printer cannot know in advance what values the user inputted for each setting (that is, SMTP Port is a value acquired by the SMTP server, while Communication Mode, Wireless Network Name, and Channel are values set by the user for the access point). Hence, the method of the second embodiment is effective because a combination error determination table cannot be created for these settings.

The second embodiment may be applied to other determination of setting items concerning the network settings. The second embodiment may be applied to other cases where the result of test according to the temporarily set settings can be determined to contain an error or not.

C. Third Embodiment

Next, a third embodiment of the invention will be described with reference to FIG. 8. Since the third embodiment differs from the other embodiments only in the error determination process, only the error determination process according to the third embodiment will be described below. The third embodiment is applied to the case where the combination of the IP Address setting item, the Subnet Mask setting item, and the Gateway setting item is subject for the error determination that matches Combination 1 in the data combination table 60, for example.

Figure 8:
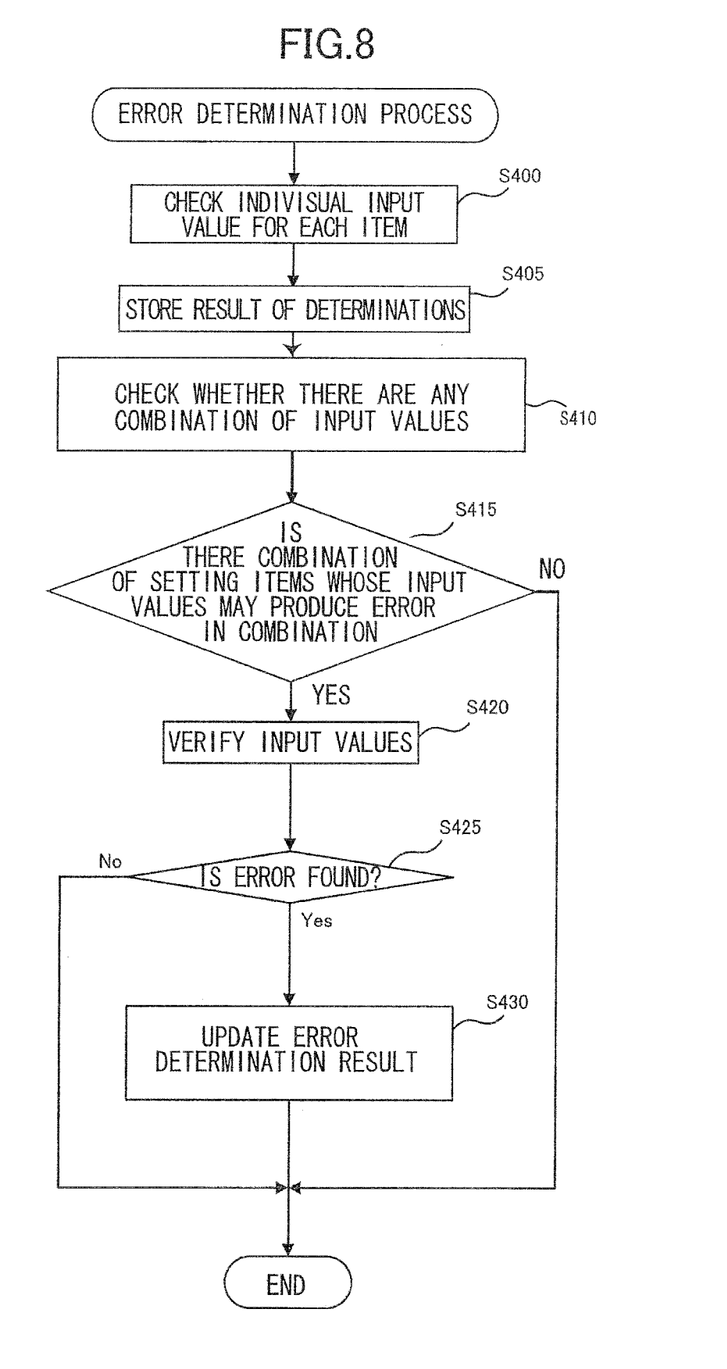
FIG. 8 is a flowchart illustrating an error determination process according to a third embodiment.

FIG. 8 is a flowchart illustrating steps in the error determination process according to the third embodiment. Since S400-S410 in FIG. 8 are identical to S200-S210 in FIG. 4 of the first embodiment, a description of these steps is omitted.

If the printer 4 determines in S415 that there exist no setting items for which an error can be determined in combination (S415: NO), the printer 4 ends the error determination process since it is not necessary to update the error determination results.

However, if the printer 4 determines that there exist setting items for which an error can be determined in combination (S415: YES), in S420 the printer 4 verifies the input values for these setting items. Specifically, in the case of the combination that matches Combination 1 in the data combination table 60, the printer 4 determines the range of input values that can be set for the Gateway setting item based on the input values for the IP Address setting item and the Subnet Mask setting item. For example, when the IP address is set to "10.135.150.28" and the subnet mask is set to "255.255.0.0," as shown in the portion (a) in FIG. 2, the printer 4 determines that the Gateway setting must fall within the range "10.135.xx.yy." Here, "xx" takes the value from 0 to 255, and "yy" takes the value from 1 to 254. Hence, in S420 the printer 4 verifies whether the input value for the Gateway setting item falls within the determined range.

In S425 the printer 4 determines based on the verification in S420 whether there is an error in the input values for setting items that can produce an error in combination. If the printer 4 verifies in S420 that the input value for the Gateway setting item falls within the determined range, in S425 the printer 4 determines that there are no errors in the input values for the IP Address setting item, the Subnet Mask setting item, and the Gateway setting item (S425: NO). However, if the printer 4 verifies in S420 that the input value for the Gateway setting item does not fall within the determined range, in S425 the printer 4 determines that an error exists in input values for the IP Address setting item, the Subnet Mask setting item, and the Gateway setting item (S425: YES).

When the printer 4 determines that the input values for these settings do not contain an error (S425: NO), the printer 4 ends the error determination process since there is no need to update the error determination results.

However, when the printer 4 determines that the input values for the settings contain an error (S425: YES), in S430 the printer 4 updates the error determination results. In other words, the printer 4 stores data indicating an error in correlation with each of the setting items corresponding to the input values verified in S420.

Accordingly, when there exist setting items for which an error may be produced in combination, the printer 4 verifies the input values for these setting items and determines whether the input values of the setting items contain an error based on the verification results. This method eliminates the need to store a combination error determination table in the ROM 14, thereby reducing the load on the printer 4. Further, since there is no need to perform a communication test as described in the second embodiment, the printer 4 can determine more quickly whether the input values for these settings contain an error.

Although three error determination processes have been described above in the first through third embodiments, the printer 4 may determine which of the error determination processes to implement as follows. Each combination listed in the data combination table may be associated with data indicating which of the error determination processes according to the first through third embodiments should be applied to the combination. Thus, the printer 4 executes the error determination process indicated by this data.

While the invention has been described in detail with reference to the embodiments thereof, it would be apparent to those skilled in the art that various changes and modifications may be made therein without departing from the scope of the invention.

For example, while the PC 6 configures settings for the printer 4 in the embodiments, the PC 6 may configure settings for any device, provided the device has a Web server function. Further, the terminal device on which operations are performed to configure settings is not limited to the PC 6, but may be any terminal device provided with a Web browser function.

Further, while the settings in the Error window 58 are displayed in italics when the input values for these items are determined to contain errors, the error display is not limited to this format. For example, settings whose input values are found to contain errors may be displayed in a different color from other settings. Alternatively, a specific mark may be displayed next to the items whose input values contain errors, or the items whose input values contain errors may be flashed on the display.

While all of the settings whose input values are found to contain errors are displayed in italics in the Error window 58 in the embodiments, the invention is not limited to this format. For example, the display format for setting items whose input values are found to contain errors may be distinguished between setting items determined to have errors individually and setting items determined to have errors in combination with other setting items. For example, if the input values for the IP Address setting item 40, the Subnet Mask setting item 42, the Gateway setting item 44, and the Boot Method setting item 48 in the Error window 58 of FIG. 2 contain errors, the IP Address setting item 40, the Subnet Mask setting item 42, and the Gateway setting item 44 may be displayed in red italics, while the Boot Method setting item 48 is displayed in blue italics. Accordingly, when input values for a plurality of settings contain errors, the user can distinguish from their display color which items contain individual errors and which items contain errors in association with other items. Further, since all the associated items for one error are displayed in the same color, the user can easily recognize which items are associated with the error.

The Error window is not limited to a window that provides a special display of setting items whose input values contain errors, such as in the Error window 58, but may be a window for advising the user that an error occurred with a setting item in association with other setting items. For example, a window may be displayed in place of the Error window 58 with the message "The IP address, the subnet mask, and the gateway are not compatible. Continue anyway?"

What is claimed is:

1. A communication device comprising a processor comprising hardware, the processor configured to:
   receive, from a terminal device, a plurality of input values corresponding to a plurality of setting items, the plurality of setting items including a plurality of related setting items that are related to each other and concern network settings;
   determine whether each individual input value among the plurality of input values has an error;
   determine whether the received input values, corresponding to the related setting items, are compatible, compatibility of the received input values, corresponding to the related setting items, being determined based on a combination of the received input values corresponding to the related setting items, the received input values corresponding to the related setting items being determined to be incompatible when the combination of the input values is found to contain an error based on a combination error determination table; and
   send, to the terminal device, error data indicating an error screen in response to at least one of, one of the plurality of input values has an error and the received input values corresponding to the related setting items are determined to be incompatible, the error screen showing that at least one input value among the plurality of input values has an error.

2. The communication device according to claim 1, wherein the error screen displays the related items whose input values are determined to be incompatible, in a manner different from setting items other than the related items whose input values are determined to be incompatible among the plurality of setting items.

3. The communication device according to claim 1, further comprising:
   a first storing unit that is configured to store reference values corresponding to the plurality of related items;
   wherein the processor determines that the input values corresponding to the plurality of related items are incompatible when the input values corresponding to the plurality of related items do not match the reference values.

4. The communication device according to claim 1, wherein the processor is further configured to:
   temporarily set the plurality of input values; and
   perform communication test based on the plurality of input values that are temporarily set;
   wherein the processor determines that the input values corresponding to the plurality of related items are incompatible when a result of the communication test results in an error.

5. The communication device according to claim 1, wherein the processor is further configured to verify that one input value among the input values corresponding to the related items falls within a range that is defined by another input value among the input values corresponding to the related items,
   wherein the processor determines that the input values corresponding to the plurality of related items are incompatible when the one input value does not fall within the range.

6. The communication device according to claim 1, further comprising a second storing unit that is configured to store a combination of reference items corresponding to the plurality of related items; and
   wherein the processor is further configured to determine whether there exists the plurality of related items among the plurality of setting items by determining whether there exists a combination of setting items among the plurality of setting items that matches the combination of reference items,
   wherein when the processor determines that there exists a combination of setting items among the plurality of setting items that matches the combination of reference items, the processor determines whether the input values corresponding to the plurality of related items are compatible.

7. A non-transitory computer readable storage medium storing a set of program instructions installed on and executed by a computer, the program instructions comprising:
   receiving, from a terminal device, a plurality of input values corresponding to a plurality of setting items, the plurality of setting items including a plurality of related setting items that are related to each other and concern network settings;
   determining whether each individual input value among the plurality of input values has an error;
   determining whether the received input values, corresponding to the related setting items, are compatible, compatibility of the received input values, corresponding to the related setting items, being determined based on a combination of the received input values correspond to the related setting items, the received input values corresponding to the related setting items being determined to be incompatible when the combination of the input values is found to contain an error based on a combination error determination table; and sending, to the terminal device, error data indicating an error screen in response to at least one of, one of the plurality of input values has an error and the received input values corresponding to the related setting items are determined to be incompatible, the error screen showing that at least one input value among the plurality of input values has an error.

8. A communication device comprising:

a processor comprising hardware, the processor being configured to:

receive, from a terminal device, a first value and a second value;

determine whether the first value falls within a first range;

determine whether the second value falls within a second range;

when it is determined that the at least one of the first value and the second value does not fall within the first range and the second range respectively, generate first error data indicating a first error screen that shows the at least one of the first value and the second value;

determine whether a combination of the first value and the second value is inappropriate based on a combination error determination table;

when it is determined that the combination of the first value and the second value is inappropriate, generate second error data indicating a second error screen that shows at least one of the first value and the second value has an error; and transmit, to the terminal device, at least one of the first error data and the second error data.

9. The communication device according to claim 8, wherein the processor is further configured to:

determine whether the first value falls within the first range and is consistent with the second value; and determine that the combination of the first value and the second value is inappropriate when it is determined that the first value falls within the first range and is not consistent with the second value.

10. The communication device according to claim 9, wherein the first value is for setting an IP address for the communication device, and the second value is for setting a Gateway address for the communication device.

* * * * *